United States Patent
Nakanishi et al.

(10) Patent No.: US 6,423,668 B1
(45) Date of Patent: *Jul. 23, 2002

(54) FRICTION MATERIAL AND METHOD OF PRODUCING THE SAME

(75) Inventors: Masatsugu Nakanishi, Numazu; Masataka Kawabata, Toyota; Atsushi Suzuki, Okazaki; Atsushi Shirasawa, Susono, all of (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,684

(22) Filed: Dec. 9, 1998

(30) Foreign Application Priority Data

Dec. 12, 1997 (JP) ............................................. 9-342674
Nov. 20, 1998 (JP) ........................................... 10-331368

(51) Int. Cl.$^7$ ......................................... C10M 125/10
(52) U.S. Cl. ....................... 508/101; 508/107; 508/108; 106/36; 523/149; 523/155
(58) Field of Search ................................ 508/100, 101, 508/107, 108; 106/36; 428/311.1; 523/149, 155

(56) References Cited

U.S. PATENT DOCUMENTS

| | | | | |
|---|---|---|---|---|
| 3,660,120 A | * | 5/1972 | Clark et al. | 106/36 |
| 4,585,691 A | * | 4/1986 | Nishimura et al. | 428/311.1 |
| 4,678,818 A | * | 7/1987 | Nakagawa et al. | 523/157 |
| 5,433,774 A | * | 7/1995 | Kapl et al. | 106/36 |
| 5,563,196 A | | 10/1996 | Kitahara et al. | 524/14 |
| 5,834,551 A | * | 11/1998 | Haraguchi et al. | 524/492 |
| 5,962,135 A | * | 10/1999 | Walker et al. | 428/408 |

FOREIGN PATENT DOCUMENTS

| | | | |
|---|---|---|---|
| JP | 58-47345 | | 10/1983 |
| JP | 61106687 | * | 5/1986 |
| JP | 03244688 | * | 10/1991 |
| JP | 05331297 | * | 12/1993 |

\* cited by examiner

Primary Examiner—Cephia D. Toomer
(74) Attorney, Agent, or Firm—Burns, Doane, Swecker & Mathis, LLP

(57) ABSTRACT

A friction material exhibiting a great coefficient of friction, as compared to that of the conventional friction material, which is produced with the use of an organic paper-like substrate. The friction material is composed of the paper-like substrate of a fibrous material, and an inorganic binder with which said substrate is impregnated. When friction is produced, the inorganic binder exhibits friction characteristics so that a great coefficient of friction can be effected, as compared to the cases organic binders such as phenol resin are used.

8 Claims, 1 Drawing Sheet

FRICTION MATERIAL AND METHOD OF PRODUCING THE SAME

BACKGROUND OF THE INVENTION

1. Field of the Invention

The present invention relates to a friction material to be used as a clutch facing or the like in a power transmission system of a motor vehicle, industrial machine, railway vehicle, etc., and the method of producing such a friction material. The friction material of the present invention is especially useful as a wet friction material to be used in oil.

2. Description of Related Art

Examples of a friction material for use in a facing of a wet clutch include a paper-like friction material, as disclosed in Japanese Patent publication Sho 58-47345, etc., which is composed of organic fiber as a paper like substrate and various friction modifiers, and is further impregnated with a binder of a thermosetting resin such as phenol resin for hardening purposes.

Such a friction material is, however, low in heat resistance and small in coefficient of friction, because the paper-like substrate and binder are both organic substances. To overcome this problem, various measures have been taken.

Examples of such various measures include increasing the number of friction discs and enlarging the area thereof in a clutch facing, for example. These measures, however, make the wet clutch construction complex and large, resulting in energy loss enlarging and costs increasing, too.

A copper-based sintered friction material, for example, has been tried to be applied to a wet clutch, too. Such a sintered friction material exhibits satisfactory heat resisance and pressure resistance even with a small number of friction discs and small area thereof to overcome the above-described problems. However, the coefficients of friction of many kinds of sintered metal-based friction material are frequently less than that of organic friction material. Consequently, the friction characteristics thereof is not good enough to be applied to a wet clutch of a recent motor vehicle with an increased performance.

SUMMARY OF THE INVENTION

It is an object of the present invention to ensure a large coefficient of friction when an organic paper-like substrate is used.

With a first aspect of the friction material of the present invention, a paper-like substrate composed of a fibrous material, and an inorganic binder with which the substrate is impregnated.

With a second aspect of the friction material of the present invention, the inorganic binder in the friction material of the first aspect contains two or more kinds of metal elements, inclusive of at least quadrivalent metal elements.

With a third aspect of the friction material of the present invention, the two or more kinds of metal elements in the friction material of the second aspect have different valences from each other.

With a fourth aspect of the present invention, the method of producing a friction material includes a first step of hydrolyzing at least one of metal alkoxide and organic group-replaced metal alkoxide to prepare a sol solution, a second step of impregnating a paper-like substrate of a fibrous material with the sol solution to prepare an impregnated substrate, and a third step of drying and firing the impregnated substrate. The first, second and third steps are performed in order.

It is preferable that silicone resin which is composed of a siloxane framework containing organic groups is further mixed with the sol solution.

The preferred weight ratio between metal alkoxide and organic group-replaced metal alkoxide ranges from 3:7 to 0:10.

It is preferable to perform the third step in an atmosphere containing ammonia. Furthermore, it is preferable to perform the third step under the supercritical conditions.

In addition, it is preferable that the paper-like substrate used in the second step is subjected to a hydroxyl group-introducing treatment previously.

With the friction material of the present invention, the fibrous material composing the paper-like substrate is bonded with the inorganic binder, resulting in the inorganic binder appearing in a surface of the substrate. Consequently, when friction is generated, the inorganic binder exhibits friction characteristics to increase the coefficient of bounding friction, resulting in a large coefficient of friction being obtained, as compared to the cases organic binder such as phenol resin is used.

The fibrous material adapted to compose the paper-like substrate is at least one of inorganic fiber such as glass fiber, rock wool, pottasium titanate fiber, ceramic fiber, silica fiber, silica-alumina fiber, kaolin fiber, bauxite fiber, boron fiber, magnesia fiber or metal fiber, and organic fiber such as linter pulp, wood pulp, synthetic pulp, polyester-based fiber, polyamide-based fiber, polyimide-based fiber, polyvinyl alcohol denatured fiber, polyvinylchloride fiber, polypropylene fiber, polybenzoimidazol fiber, acryl fiber, carbon fiber, phenol fiber, nylon fiber or cellulose fiber.

Examples of the inorganic binder include metal oxide such as silica, alumina, titania, zirconia or silica-alumina, and organic functional group-composite metal oxide containing groups such as methyl group or phenyl group. It is preferable that the binder contains silicone resin, too. Soft silicone resin enables both improvement of the flexibility and increase of the contacting area, resulting in further increase of the coefficient of friction. The preferred amount of silicone resin ranges from 5 to 70 parts by weight per 100 parts by weight of the total amount of the inorganic binder and silicone resin. If the amount of silicone resin is greater than the above range, the coefficient of friction decreases while the amount of silicone resin is less than theabove range, the effect resulting from the addition of silicone resin is difficult to be exhibited.

In addition, at least one or more various friction modifiers and fillers such as barium sulfide, calcium carbonate, magnesium carbonate, silicon carbide, boron carbide, titan carbide, silicon nitride, boron nitride, alumina, silica, zirconia, cashew dust, rubber dust, diatomaceous earth, talc, kaoline, magneisum oxide, molybdenum disulfide, nitrile rubber, acrylonitrile-butadiene rubber, styren butadiene rubber, silicon rubber or fluoro rubber, can be added by a proper amount.

The preferred composition ratio of these components is such that the amount of the inorganic binder ranges from 10 to 70 volume % per 100% of the total amount of the fibrous material, friction modifiers, etc. If the amount of the inorganic binder is less than the above range, the bonding strength of fibers in the paper-like substrate decreases to reduce the durability, whereas if the amount of the inorganic binder is greater than the above range, the friction characteristics decrease.

It is preferable that the inorganic binder as one component of the friction material of the present invention contains two or more kinds of metal elements, inclusive of at least quadrivalent metal elements. With this arrangement, greater coefficients of friction and higher abrasion resistance are ensured.

The reason for this effect has not been clarified. However, it can be considered that into the space defined mainly by one kind of metal elements, the other kind of metal elements are introduced to produce a proper twisting in molecules, and consequently, internal stress is generated to increase the strength of the binder framework.

It is preferable that the metal elements including at least quadrivalent metal elements have different valences. More specifically, it is preferable to include quadrivalent metal elements and tervalent metal elements, or include quadrivalent metal elements and bivalent metal elements, for example. With this arrangement, the coefficients of friction further increase and the abrasion resistance is further improved.

Examples of the quadrivalent metal elements include silicon (Si) and titanium (Ti). Examples of the tervalent metal elements include aluminum (Al), gallium (Ga) and iron (Fe), and examples of the bivalent metal elements include magnesium (Mg), calcium (Ca) and barium (Ba). In some cases, univalent metal elements such as potassium (K) or sodium (Na) can be used, too.

The preferred amount of the tervalent metal elements ranges from 0.1 to 5% of the entire metal elements in the binder in the number of atoms. Outside this range, the abrasion resistance decreases, whereas, inside this range, the abrasion resistance remarkably increases.

The preferred amount of the bivalent metal elements ranges from 0.2 to 10% of the entire metal elements in the binder in the number of atoms. Outside this range, the abrasion resistance decreases, whereas, inside this range, the abrasion resistance remarkably increases.

With the method in accordance with the present invention, in the first step, at least one of metal alkoxide and organic group-replaced metal alkoxide is first hydrolyzed to prepare a sol solution. Alkoxide such as silicon (Si), titanium (Ti), aluminum (Al), gallium (Ga), iron (Fe), magnesium (Mg), calcium (Ca) or barium (Ba) can be used as the metal alkoxide. The organic group-replaced metal alkoxide can be prepared by partly replacing the alkoxyl groups of the metal alkoxide with alkyl groups.

It is preferable that the alkoxide used contains metal alkoxide or organic group-replaced metal alkoxide of at least quadrivalent metal elements and further contains metal alkoxide or organic group-replaced metal alkoxide of different kinds of metal elements. It is more preferable that the alkoxide used contains metal alkoxide or organic group-replaced metal alkoxide of at least quadrivalent metal elements and further contains metal alkoxide or organic group-replaced metal alkoxide of metal elements of different valences.

The preferred weight ratio between metal alkoxide and organic group-replaced metal alkoxide ranges from 3:7 to 0:10. If the amount of metal alkoxide is greater than this range, the flexibility of the friction material decreases and the contact area also decreases, resulting in the coefficient of friction being reduced.

This first step can be performed by adding water to an alcohol solution of at least one of metal alkoxide and organic group-replaced metal alkoxide. Thus, a sol solution of hydroxides is formed. It is preferable to add acid or alkali or apply heat in the first step to improve the reactivity therein.

It is preferable that, in the first step, silicone resin which is composed of a siloxane framework containing organic groups is further added to the sol solution. With this arrangement, soft silicone resin composes one part of the binder of the friction material, resulting in the flexibility being improved and the coefficient of friction being further increased.

In the second step, the paper-like substrate of a fibrous material is impregnated with the sol solution prepared in the first step to prepare an impregnated substrate wherein sol of metal hydroxide filles the spaces between fibers. In the cases of various friction modifiers or the like being used, they may be added to the sol solution prepared inthe first step, or may be mixed with the fibrous material prior to the preparation of the paper-like substrate. Alternatively, they can be adhered to the surface of the substrate impregnated with the sol solution by sprinkling.

It is preferable that the paper-like substrate used in the second step is subjected to a hydroxyl group-introducing treatment. The hydroxyl group introduced enables a great improvement of the bonding strength of the paper-like substrate and binder, and a further improvement of the friction characteristics.

The hydroxyl group-introducing treatment is performed by treating with acid, for example. Inorganic acid or organic acid can be used as the acid for the above treatment. It is preferable to use organic acid such as acetic acid or oxalic acid. When the organic acid is used, upon firing in the following third step, remaining acid components are decomposed to disappear so that the influence on the friction characteristics can be ignored.

The acid treatment can be performed readily by immersing the paper-like substrate in an acid solution, or spraying the acid solution on the paper-like substrate such that the paper-like substrate is impregnated with the acid solution.

Other examples of the hydroxyl group-introducing method includes treating in an alkali aqueous solution such as an aqueous solution of sodium hydroxide, treating in a boiling water or treating in a supercritical vapor. With these treatments, hydroxyl groups can be introduced in the paper-like substrate so that the bonding strength with the binder is greatly improved, and consequently, the friction characteristics are further improved.

It can be considered that with the hydroxyl group-introducing treatment, the affinity between the metal hydroxide formed in the second step and the paper-like substrate increases, resulting in the hydroxyl groups of the metal hydroxide and the hydroxyl groups of the paper-like substrate are respectively oriented to get close to each other.

In the third step, the impregnated substrate is dried and fired, resulting in the hydroxide sol changing to oxide gel to bond fibers of the substrate firmly. In the case a large amount of organic group-replaced metal akloxide being used in the first step, the organic groups therein are oriented in the second step in such a way as to get close to the organic fibers of the substrate, and are bonded to the organic fibers more firmly in the third step, resulting in the strength being further improved. In addition, the organic groups enable improvement of the flexibility to increase the coefficient of friction.

If the paper-like substrate is subjected to the hydroxyl group-introducing treatment prior to the second step, the metal hydroxide and fibers are respectively oriented in the second step in such a way as to get close to each other, and the oxide gel and fibers are bonded firmly in the third step, resulting in the strength being further improved.

It is preferable to perform firing in the third step at 150 to 300° C. for 0.5 to 1.0 hours. If the firing temperature is lower than this temperature range, or the firing time is shorter than this time range, the formation of oxide gel becomes difficult, resulting in sufficiently great strength being not obtained. If the firing temperature is higher than this temperature range, or the firing time is longer than this time range, organic substances are decomposed, resulting in the friction characteristics being lowered.

It is also preferable to perform the third step in the atmosphere containing ammonia. It can be considered that, with this arrangement, metal elements in the sol are partly nitrized. As a result, the coefficient of friction is further increased. The effect due to ammonia is obtained even if the content is a little. But, the maximum effect is obtained when about 10 volume % of ammonia is contained in the atmosphere in the third step.

It is desirable to perform the third step under the supercritical conditions. The supercritical conditions mean the conditions for bringing the organic substances in the substrate and sol to the state just before being vaporized, where molecular motions are very active. By applying pressure, the temperature at which the organic substances are brought into the supercritical state is elevated, and the molecular motions are further activated. Accordingly, the supercritical conditions are high-temperature and high-pressure conditions. With the high-temperature and high-pressure supercritical conditions, the decomposition of the organic substances can be prevented while the reactivity thereof can be improved, resulting in unreacted components being restrained from remaining. Consequently, the friction material having a large coefficient of friction can be produced stably.

With the friction material in accordance with the present invention, a large coefficient of friction can be ensured with the use of an organic paper-like substrate, and consequently, there is no need of piling many pieces of substrates, which has been needed with the conventional friction material. This results in disadvantages such as increase of energy loss causesd by a complicated and large-sized wet clutch construction being avoided, and the production costs becoming inexpensive.

And, with the addition of two or more kinds of metal elements, inclusive of at least quadrivalent metal elments, the abrasion resistance is further improved.

With the method of producing the friction material in accordance with the present invention, the friction material having a large coefficient of friction can be produced readily and stably with the use of the organic paper-like substrate.

Other objects, features, and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
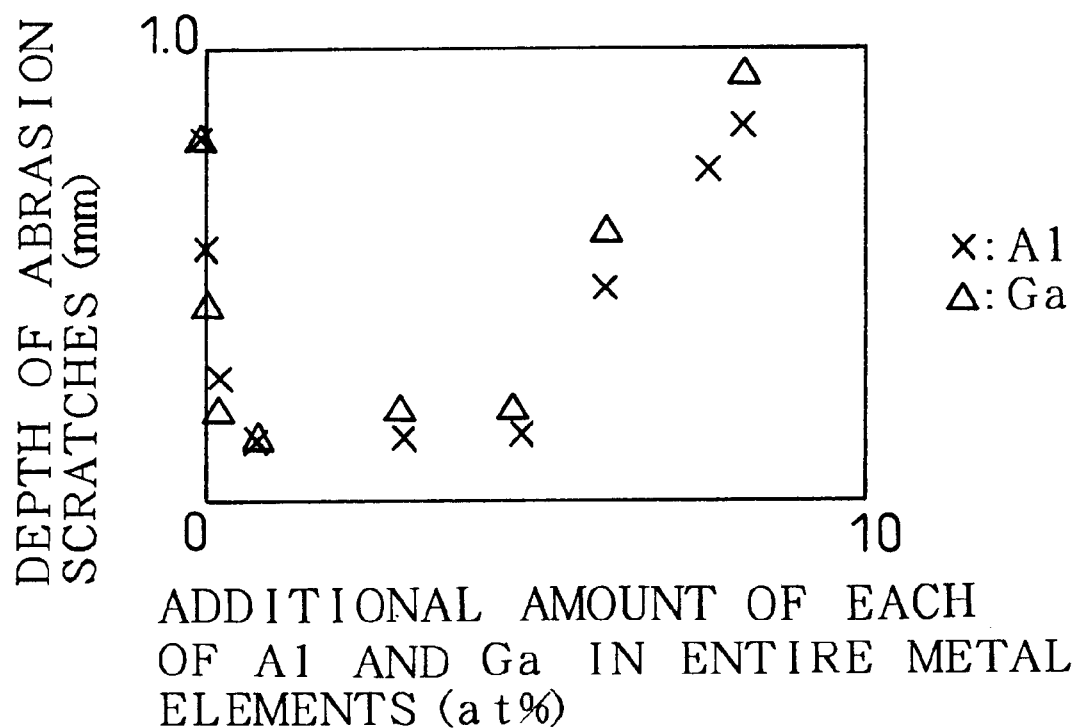
FIG. 1 is a graph showing the relation between the ratio of the number of atoms of tervalent metal elements to that of the entire metal elements in a binder of one embodiment of a friction material in accordance with the present invention and the depth of abrasion scratches.

Hereinafter, the present invention will be explained in detail based on several embodiments of the present invention and comparative examples.

Embodiment 1

(1) First Step 27.6 g of ethanol and 20.8 g of tetraethoxysilane(Si$(OC_2H_5)_4$) were weighed in a glass vessel and stirred four 10 minutes. Then, while stirring this solution, 20 g of an aqueous solution of 0.05 N hydrochloric acid was dropped thereon. A resultant solution was further stirred for 24 hours to prepare a sol solution.

(2) Second Step

A paper-like substrate composed of linter pulp was prepared, and the paper-like substrate was impregnated with the entire amount of the prepared sol solution to obtain an impregnated substrate.

(3) Third Step

The obtained impregnated substrate was dried at room temperature for 1 hour, and fired in the air at 200° C. for 1 hour to prepare a wet friction material of Embodiment 1.

Embodiment 2

27.6 g of ethanol, 10.4 g of tetraethoxysilane (Si$(OC_2H_5)_4$) and 9 g of methyl trimethoxysilane ($CH_3Si(OC_2H_5)_3$) were weighed in a glass vessel and stirred four 10 minutes. Then, while stirring this solution, 20 g of an aqueous solution of 0.05 N hydrochloric acid was dropped thereon. A resultant solution was further stirred for 24 hours to prepare a sol solution.

The second and third steps, each being similar to those of Embodiment 1, were performed by using the prepared sol solution, to prepare a wet friction material of Embodiment 2.

Embodiment 3

(1) First Step 27.6 g of ethanol, 10.4 g of tetraethoxysilane (Si$(OC_2H_5)_4$) and 9 g of methyl trimethoxysilane ($CH_3Si(OC_2H_5)_3$) were weighed in a glass vessel and stirred four 10 minutes. Then, while stirring this solution, 20 g of an aqueous solution of 0.05 N hydrochloric acid was dropped thereon. A resultant solution was further stirred for 24 hours to prepare a sol solution.

(2) Second Step

A paper-like substrate composed of linter pulp was prepared, and the paper-like substrate was impregnated with an entire amount of the prepared sol solution to obtain an impregnated substrate.

(3) Third Step

The obtained impregnated substrate was dried at room temperature for 1 hour, and fired in an atmosphere of the air to which 10 volume % of ammonia ($NH_3$ was added, at 200° C. for 1 hour to prepare a wet friction material of Embodiment 3.

Embodiment 4

(1) First Step 27.6 g of ethanol, 10.4 g of tetraethoxysilane (Si$(OC_2H_5)_4$) and 9 g of methyl trimethoxysilane ($CH_3Si(OC_2H_5)_3$) were weighed in a glass vessel and stirred four 10 minutes. Then, while stirring this solution, 20 g of an aqueous solution of 0.05 N hydrochloric acid was dropped thereon. A resultant solution was further stirred for 24 hours to prepare a sol solution.

(2) Second Step

A paper-like substrate composed of linter pulp was prepared, and the paper-like substrate was impregnated with an entire amount of the prepared sol solution to obtain an impregnated substrate.

(3) Third Step

The obtained impregnated substrate was dried for 1 hour with impregnated with the entire amount of the sol solution at room temperature. Then, the impregnated substrate was placed in an autoclave, and the temperature thereof was elevated to 250° C. with the pressure increased to 7 MPa to fire the impregnated substrate in its supercritical state for 1 hour, thus preparing a wet friction material of Embodiment 4.

Embodiment 5

27.6 g of ethanol, 10.4 g of tetraethoxysilane ($Si(OC_2H_5)_4$), 9 g of methyl trimethoxysilane ($CH 3 Si(OC_2H_5)_3$) and 5 g of polydimethyl siloxane were weighed in a glass vessel and stirred four 10 minutes. Then, while stirring this solution, 20 g of an aqueous solution of 0.05 N hydrochloric acid was dropped thereon. A resultant solution was further stirred for 24 hours to prepare a sol solution.

The second and third steps, each being similar to those of Embodiment 1, were performed by using the prepared sol solution, to prepare a wet friction material of Embodiment 5.

Comparative example 1

A friction material on the market (for use in SAE-No. 2 test of JASO) was prepared as a friction material of Comparative example 1.

Experiment, Evaluation

The coefficients of friction at 0.01 m/sec, 0.5 m/sec, 1.0 m/sec and 1.5 m/sec of each of the wet friction materials thus prepared were measured in oil of 120° C., under a surface pressure of 10 $kg/cm^2$ by using an iron-based material as a material adapted to produce friction with the wet friction materials thus prepared. The measurement results are shown in TABLE 1.

TABLE 1

|  | Coefficient of friction | | | |
| --- | --- | --- | --- | --- |
|  | 0.01 m/sec | 0.5 m/sec | 1.0 m/sec | 1.5 m/sec |
| Embodiment1 | 0.20 | 0.20 | 0.20 | 0.20 |
| Embodiment2 | 0.18 | 0.17 | 0.17 | 0.17 |
| Embodiment3 | 0.19 | 0.19 | 0.19 | 0.19 |
| Embodiment4 | 0.20 | 0.20 | 0.20 | 0.20 |
| Embodiment5 | 0.20 | 0.20 | 0.20 | 0.20 |
| Comparative example1 | 0.13 | 0.13 | 0.13 | 0.13 |

TABLE 1 clearly shows that the friction material of each embodiment exhibits large coefficients of friction, as compared to those of Comparative example 1, which are stable even with the variation of the measurement speed.

Embodiment 1 differs from Embodiment 2 in that, in the first step, methyl trimethoxysilane ($CH_3Si(OC_2H_5)_3$) is contained or not. Embodiment 1, however, exhibits large coefficients of friction, as compared to Embodiment 2, because the binder does not contain organic components (methyl groups). Even Embodiment 2 exhibits high coefficients of friction, as compared to Comparative example 1 which is a conventional friction material. These measurement results clearly show that with the use of the inorganic binder, the coefficient of friction increases.

Upon comparing Embodiment 2 with Embodiments 3 through 5, the coefficients of friction of Embodiment 3 are increased, as compared to Embodiment 2, by merely introducing ammonia gas upon firing. This result can be considered to be caused by the metal composing the inorganic binder being partly nitrized. Even Embodiment 4 which was fired in the supercritical conditions under pressure exhibits the coefficients of friction greater than those of Embodiment 2. This result can be considered to be caused by the formation of an inorganic framework with the sol-gel method being promoted.

Furthermore, Embodiment 5 containing silicone resin composed of a siloxane framework and organic groups also exhibits increased coefficients of friction, as compared to those of Embodiment 2. This result can be considered to be caused by the flexibility of the friction material being improved with silicone resin, resulting in the contact area with a material adapted to produce friction with the friction material of Embodiment 5 increasing.

Embodiment 6

Ethanol and methyl trimethoxysilane ($CH_3Si(OC_2H_5)_3$ were weighed in a glass vessel and a sol solution was prepared similarly to Embodiment 1.

The second and third steps, each being similar to those of Embodiment 1, were performed by using the prepared sol solution, thus preparing e a wet friction material of Embodiment 6.

Embodiment 7

An ethanol solution containing methyl trimethoxysilane ($CH_3Si(OC_2H_5)_3$) and tetraethoxysilane ($Si(OC_2H_5)_4$) in the weight ratio of 7:3 was prepared, and by using the prepared ethanol solution, a sol solution was prepared, similarly to the method of Embodiment 1.

The second and third steps, each being similar to those of Embodiment 1, were performed by using the prepared sol solution, thus preparing a wet friction material of Embodiment 7.

Embodiment 8

An ethanol solution containing methyl trimethoxysilane ($CH_3Si(OC_2H_5)_3$) and tetraethoxysilane ($Si(OC_2H_5)_4$) in the weight ratio of 5:5 was prepared, and by using the prepared ethanol solution, a sol solution was prepared, similarly to the method of Embodiment 1. The second and third steps, each being similar to those of Embodiment 1, were performed by using the prepared sol solution, thus preparing a wet friction material of Embodiment 8.

Experiment, Evaluation

The coefficients of friction in oil of 120° C. of each of the wet friction materials of Embodiments 6 through 8 were measured, similarly to Embodiment 1. The measurement was performed with an iron-based material as a material adapted to produce friction with the wet friction materials of these embodiments, under a surface pressure of 10 $kg/cm^2$, at a speed of 1.5 m/sec. Furthermore, the heat resistance was evaluated with SAE#2 friction testing machine. The measurement results are shown in TABLE 2 with that of Comparative example 1.

TABLE 2

|  | Embodiment 6 | Embodiment 7 | Embodiment 8 | Comparative example 1 |
| --- | --- | --- | --- | --- |
| Coefficient of friction | 0.200 | 0.180 | 0.150 | 0.130 |
| Heat resistance (Number of cycles) | 2000 OK | 2000 OK | 2000 OK | 1500 NG |

TABLE 2 clearly shows that the friction material of each of Embodiments 6 through 8 exhibits a large coefficient of friction and excellent heat resistance, as compared to Comparative example 1, and also shows that as the amount of tetraethoxysilane increases, the coefficient of friction gradually decreases, and in Embodiment 8, the coefficient of friction is close to that of Comparative example 1. It is clear from these results that the preferred coefficient of friction is greater than that of Embodiment 8 and the preferred composition ratio of $Si(OC_2H_5)_4$ and $CH_3Si(OC_2H_5)_3$ ranges from 3:7 to 0:10.

Embodiment 9

(1) First Step 27.6 g of ethanol, 18 g of methyl trimethoxysilane ($CH_3Si(OC_2H_5)_3$) were weighed in a glass vessel and stirred for 10 minutes. Then, while stirring this solution, 20 g of an aqueous solution of 0.05 N hydrochloric acid was dropped thereon. A resultant solution was further stirred for 24 hours to prepare a sol solution.

(2) Second Step

A paper-like substrate composed of linter pulp was prepared, and the paper-like substrate was impregnated with the entire amount of the prepared sol solution to obtain an impregnated substrate.

(3) Third Step

The obtained impregnated substrate was dried at room temperature for 1 hour. Then, the impregnated substratewas fired in the air at 200° C. for 1 hour to prepare a wet friction material of Embodiment 9.

Embodiment 10

The first, second and third steps, each being similar to those of Embodiment 9 except that in the first step, 27.6 g of ethanol, 18 g of methyl trimethoxysilane ($CH_3Si(OC_2H_5)_3$) and 0.13 g of ethyl acetate aluminum diisopropylate were weighed, were performed to prepare a wet friction material of Embodiment 10.

Embodiment 11

The first, second and third steps, each being similar to those of Embodiment 9 except that in the first step, 27.6 g of ethanol, 18 g of methyl trimethoxysilane ($CH_3Si(OC_2H_5)_3$) and 0.97 g of triethoxygallium were weighed, were performed to prepare a wet friction material of Embodiment 11.

Embodiment 12

The first, second and third steps, each being similar to those of Embodiment 9 except that in the first step, 27.6 g of ethanol, 18 g of methyl trimethoxysilane ($CH_3Si(OC_2H_5)_3$) and 0.04 g of dimethoxymagnesium were weighed, were performed to prepare a wet friction material of Embodiment 12.

Embodiment 13

A paper-like substrate composed of linter pulp was immersed in an aqueous solution of 0.01N hydrochloric acid, previously. After sufficiently impregnated with the aqueous solution, the paper-like substrate was removed therefrom and dried naturally. The first, second and third steps, each being similar to those of Embodiment 9 except that the hydrochloric acid-impregnated substrate was used as the paper-like substrate, were performed to prepare a wet friction material of Embodiment 13.

Embodiment 14

A paper-like substrate composed of linter pulp was immersed in an aqueous solution of 0.1N acetic acid, previously. After sufficiently impregnated with the aqueous solution, the paper-like substrate Was removed therefrom and dried naturally. The first, second and third steps, each being similar to those of Embodiment 9 except that the acetic acid-impregnated substrate was used as the paper-like substrate, were performed to prepare a wet friction material of Embodiment 14.

Embodiment 15

A paper-like substrate composed of linter pulp was immersed in an aqueous solution of 0.1N sodium hydroxide, previously. After sufficiently impregnated with the aqueous solution, the paper-like substrate was removed therefrom and dried naturally. The first, second and third steps, each being similar to those of Embodiment 9 except that the sodium hydroxide-impregnated substrate was used as the paper-like substrate, were performed to prepare a wet friction material of Embodiment 15.

Embodiment 16

A paper-like substrate composed of linter pulp was immersed in a boiling water for 1 minute, previously. Then, the paper-like substrate was removed therefrom and dried naturally. The first, second and third steps, each being similar to those of Embodiment 9 except that the boiling water-treated substrate was used as the paper-like substrate, were performed to prepare a wet friction material of Embodiment 16.

Embodiment 17

A paper-like substrate composed of linter pulp was exposed to a supercritical vapor for 1 minute, previously. Then, the paper-like substrate was dried naturally. The first, second and third steps, each being similar to those of Embodiment 9 except that the supercritical vapor-treated substrate was used as the paper-like substrate, were performed to prepare a wet friction material of Embodiment 17.

Experiment, Evaluation

The coefficients of friction in oil of 120° C. of each of the wet friction materials of Embodiments 9 through 17 were measured, similarly to Embodiment 1. Furthermore, the depth of abrasion scratches in each substrate which was after the measurement of the coefficients of friction was measured. The measurement results are shown in TABLE 3.

TABLE 3

| | Metal element | Hydroxyl group introducing treatment | Coefficient of friction | | | |
|---|---|---|---|---|---|---|
| | | | 0.01 m/sec | 0.5 m/sec | 1.0 m/sec | 1.5 m/sec |
| Embodiment 9 | Si | — | 0.18 | 0.18 | 0.18 | 0.18 |
| Embodiment 10 | Si, Al | — | 0.22 | 0.23 | 0.23 | 0.23 |
| Embodiment 11 | Si, Ga | — | 0.20 | 0.21 | 0.21 | 0.21 |
| Embodiment 12 | Si, Mg | — | 0.22 | 0.22 | 0.22 | 0.22 |
| Embodiment 13 | Si | hydrochloric acid | 0.19 | 0.19 | 0.19 | 0.19 |

TABLE 3-continued

| | | | | | | |
|---|---|---|---|---|---|---|
| Embodiment 14 | Si | acetic acid | 0.19 | 0.19 | 0.19 | 0.19 |
| Embodiment 15 | Si | NaOH | 0.19 | 0.19 | 0.19 | 0.19 |
| Embodiment 16 | Si | boiling water | 0.19 | 0.19 | 0.19 | 0.19 |
| Embodiment 17 | Si | supercritical vapor | 0.19 | 0.19 | 0.19 | 0.19 |

| | Depth of abrasion scratches (mm) |
|---|---|
| Embodiment 9 | 0.8 |
| Embodiment 10 | 0.1 |
| Embodiment 11 | 0.1 |
| Embodiment 12 | 0.2 |
| Embodiment 13 | 0.4 |
| Embodiment 14 | 0.3 |
| Embodiment 15 | 0.4 |
| Embodiment 16 | 0.3 |
| Embodiment 17 | 0.2 |

TABLE 3 shows that the friction material of each of Embodiments 10, 11 and 12 exhibits large coefficients of friction and excellent heat resistance, as compared to Embodiment 9. It is clear that these results are caused by the use of tervalent aluminum (Al), gallium (Ga) or bivalent magnesium (Mg) in addition to quadrivalent silicon.

Upon comparing Embodiments 10 through 12 with each other, in the cases the bivalent metal elements are added, excellent characteristics can be obtained even with a small amount, as compared to the cases the tervalent metal elements are added. This result can be considered to be caused by the molecular construction of the binder greatly twisting with the addition of the bivalent metal elements, as compared to the cases of the tervalent metal elements, to further increase the framework strength.

Furthermore, upon comparing Embodiments 13 through 17 with Embodiment 9, the friction material of each of Embodiments 13 through 17 exhibits an improved abrasion resistance, as compared to Embodiment 9. It is clear that this result is caused by the paper-like substrate being subjected to the hydroxyl group-introducing treatment to improve the adhesion of the substrate and binder.

Embodiment 18

To examine the quantitative influence of the tervalent metal elements, wet friction materials were prepared similarly to Embodiments 10 and 11, respectively, except that the amount of ethyl acetate aluminum diisopropylate and amount of triethoxygallium were respectively selected on several levels. The depth of abrasion scratches in the substrate of each wet friction material was measured after measuring the coefficient of friction thereof, similarly to Embodiment 1. The measurement results are shown in FIG. 1 together with those of Embodiments 9 through 11.

FIG. 1 clearly shows that when the number of atoms of each of Al and Ga is 0.1% or more of that of the entire metal elements in the binder, excellent abrasion resistance can be obtained, and when the number of atoms of each of Al and Ga exceeds 5% of that of the entire metal elements in the binder, the abrasion resistance decreases again, It is clear from FIG. 1 that the preferred number of atoms of each tervalent metal element ranges from 0.1 to 5% of that of the entire metal elements in the binder While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A friction material consisting essentially of:
   a substrate composed of a fibrous material; and a binder consisting of
   an inorganic binder, said inorganic binder being bonded with said fibrous material to appear in a surface of said substrate,
   wherein said inorganic binder is produced by hydrolyzing at least one of metal alkoxide selected from the group consisting of Si, Ti, Al, Ga, Fe, Mg, Ca, Ba, Na, and K, and organic group-replaced metal alkoxide prepared by partly replacing alkoxyl groups of said metal alkoxide with alkyl groups to prepare a sol solution,
   impregnating said substrate with said sol solution, and
   firing said substrate impregnated with said sol solution.

2. A friction material as claimed in claim 1, wherein said sol solution comprises at least two kinds of metal hydroxides, and wherein at least one of said metal hydroxides contains a quadrivalent metal.

3. A friction material as claimed in claim 1, wherein an amount of said inorganic binder ranges from 10 to 70 volume % per 100% of the total amount of said substrate.

4. A friction material as claimed in claim 2, wherein said at least two kinds of metal hydroxides have different valences from each other.

5. A friction material as claimed in claim 4, wherein said at least two kinds of metal hydroxides comprise tervalent metal hydroxides.

6. A friction material as claimed in claim 4, wherein said at least two kinds of metal hydroxides comprise bivalent metal hydroxides.

7. A friction material as claimed in claim 5, wherein the amount of tervalent metal hydroxides ranges from 0.1 to 5% based on total number of atoms of metal hydroxides in said binder.

8. A friction material as claimed in claim 6, wherein the amount of bivalent metal hydroxides ranges from 0.2 to 10% based on total number of atoms of metal hydroxides in said binder.

* * * * *